United States Patent [19]

Ochs

[11] 4,026,059

[45] May 31, 1977

[54] LIGHTED FISHING ROD

[76] Inventor: William R. Ochs, 15523 Clifton Blvd., Lakewood, Ohio 44107

[22] Filed: Sept. 29, 1975

[21] Appl. No.: 617,288

[52] U.S. Cl. ............................. 43/17.5; 43/18 GF
[51] Int. Cl.² ...................................... A01K 87/00
[58] Field of Search ..................... 43/17.5, 18 GF

[56] References Cited

UNITED STATES PATENTS

| | | | |
|---|---|---|---|
| 2,579,087 | 12/1951 | Organ | 43/17.5 |
| 3,017,499 | 1/1962 | Fore | 43/17.5 X |
| 3,862,509 | 1/1975 | Petersen, Jr. | 43/17.5 |

*Primary Examiner*—Louis G. Mancene
*Assistant Examiner*—Daniel J. Leach

[57] ABSTRACT

A fishing rod assembly, the rod of which is a transparent or translucent member fitted to a handle in which a flashlight bulb is mounted for projecting light along the length of the rod from the handle to the rod tip. The rod may be fabricated of compacted glass fiber that transmits light and is formed at the handle end in the shape of a threaded cap that fastens over threads fitted on the rod end of the handle assembly. The flashlight bulb is mounted at the rod end of the handle assembly and is connected by wires to a battery or batteries mounted in a removable section of the handle.

1 Claim, 4 Drawing Figures

LIGHTED FISHING ROD

SUMMARY OF THE INVENTION

My invention is a fishing rod assembly, the rod of which is a transparent or translucent member fitted to a handle in which a flashlight bulb is mounted for projecting light along the length of the rod from the handle to the rod tip. The rod may be fabricated of compacted glass fibre that transmits light and is formed at the handle end in the shape of a threaded cap that fastens over threads fitted on the rod end of the handle assembly. The flashlight bulb is mounted at the rod end of the handle assembly and is connected by wires to a battery or batteries mounted in a removable section of the handle.

By means of my invention, fisherman, at night is able to see the length of his fishing rod, both when casting, and when tracing the line leading from the fishing rod.

BRIEF DESCRIPTION OF THE DRAWINGS

The objects and features of the invention may be understood with reference to the following detailed description of an illustrative embodiment of the invention, taken together with the accompanying drawings in which.

DESCRIPTION OF THE PREFERRED EMBODIMENT

Figure 1:
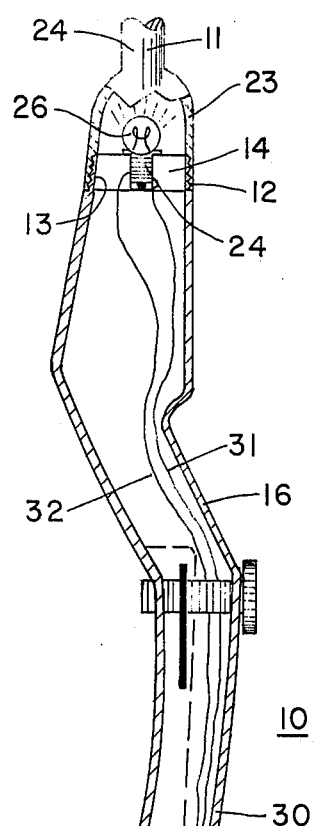
FIG. 1 is a sectional fragmentary view of the invention.

Turning now descriptively to the drawings, in which similar reference characters denote similar elements throughout the several views, FIG. 1 illustrates the fishing rod assembly 10 comprising a glass fibre rod 11 joined by mating screw threads 12–13 to the rod end 14 of the handle assembly 16. The butt end 17 of the handle assembly 16 is a hollow tubular housing encasing batteries 18, which may be replaced by removal of end cap 19 in which a coil compression spring 22 is mounted.

Figure 2:
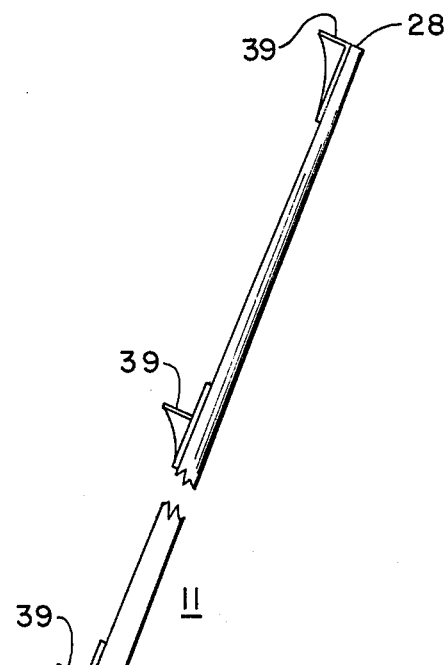
FIG. 2 is an elevation view of the rod section.
Figure 3:
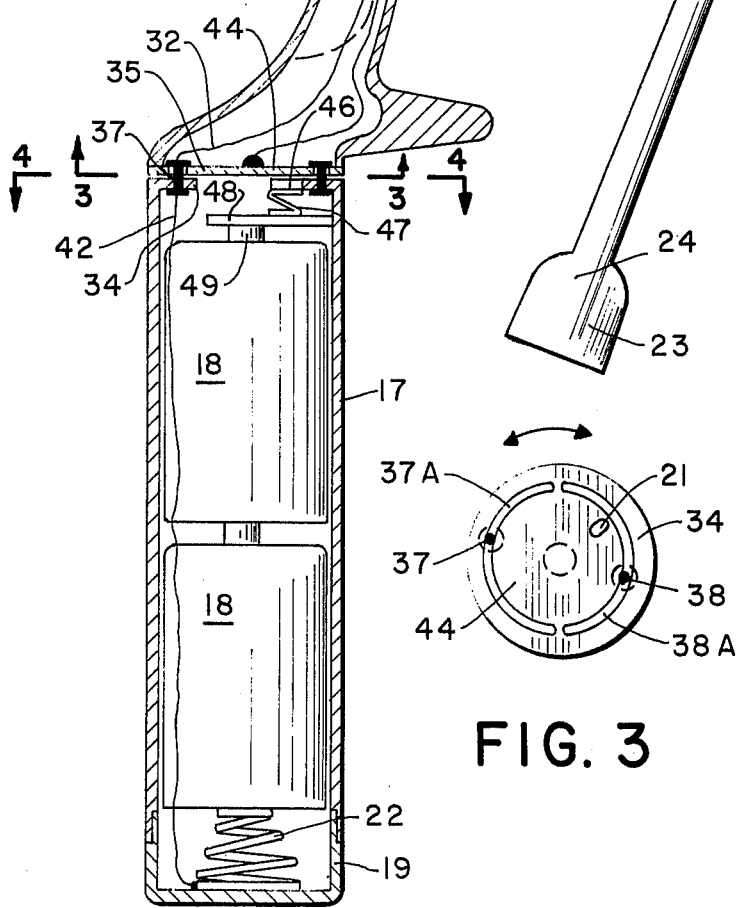
FIG. 3 is a sectional view taken from line 3—3 of FIG. 1.
Figure 4:
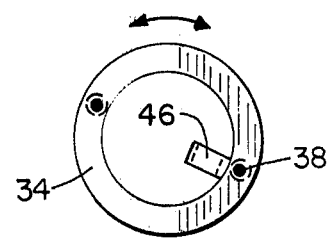
FIG. 4 is a sectional view taken from line 4—4 of FIG. 1.

A lamp socket 24 is formed in rod section 11 and has an enlarged and threaded cap section 23, so that light from a bulb 26 mounted in socket 24 will project along the length of the glass fibres of rod 11 to illuminate rod section 11 and project as a beam from rod tip 28. The transverse diameter of cap section 23 is greater than the diameter of the attached rod section 11 as shown in FIGS. 1–2 so that the light from the lamp will also be cast about the exterior of the length of the rod section and illuminate the fishing line.

Socket 24 is connected by a pair of wires 31 and 32 to batteries 18, through a switching unit 35.

Switching unit 35 is operated by rotation of handle butt 17 with respect to handle arm section 30 to which a fishing reel (not shown) may be attached. Handle butt 17 is formed with a flanged rim section 34 in which two spaced apart rivets 37 and 38 are fitted, with rivets 37 and 38 riding in slots 37A and 38A of the end plate 44 of arm section 30. One electrical wire 32 is permanently fixed to rivet 37 which is connected by a wire 42, fixed in the handle butt 17 to battery spring 22. The other electrical wire 31 is connected to a metal contact 21 in end plate 44 which contacts rivet 38 when butt 17 is rotated to the ON position. Rivet 38 is connected in butt 17 to a contact member 46 fastened by a compression spring 47 to a plate 48 that contacts the anode pole 49 of the topmost battery 18.

Line guy loops 39 may be externally fixed on rod 11 as desired.

Since obvious changes may be made in the specific embodiment of the invention described herein, such modifications being within the spirit and scope of the invention claimed, it is indicated that all matter contained herein is intended as illustrative and not as limiting in scope.

Having thus described the invention, what I claim as new and desire to secure by Letters Patent of the United States is:

1. A fishing pole fitted with a rod section detachably joined to a hollow handle section,
   said rod section formed of light transmitting compacted glass fibres,
   said handle section fitted internally with a battery joined by switching means to a lamp bulb socket mounted at an end of the handle section, a surface of the wall of said end of the handle section formed in the shape of a screw thread,
   said rod section formed with an end section shaped as a hollow cap of a size to enclose a lamp bulb and of a transverse dimension greater than the transverse diameter of the remainder of the said attached rod section, with a surface of the wall of said rod end section formed as a screw thread of a shape to matingly engage the screw thread of the end of the handle section such that a lighted lamp bulb mounted in the said socket will cast a beam extending both through the interior of the attached rod section and about the exterior of the length of the said rod section, so as to illuminate an externally attached fishing line.

* * * * *